Oct. 18, 1927.
G. E. METHERD
1,646,159
DIRECTION INDICATOR
Filed April 29, 1927
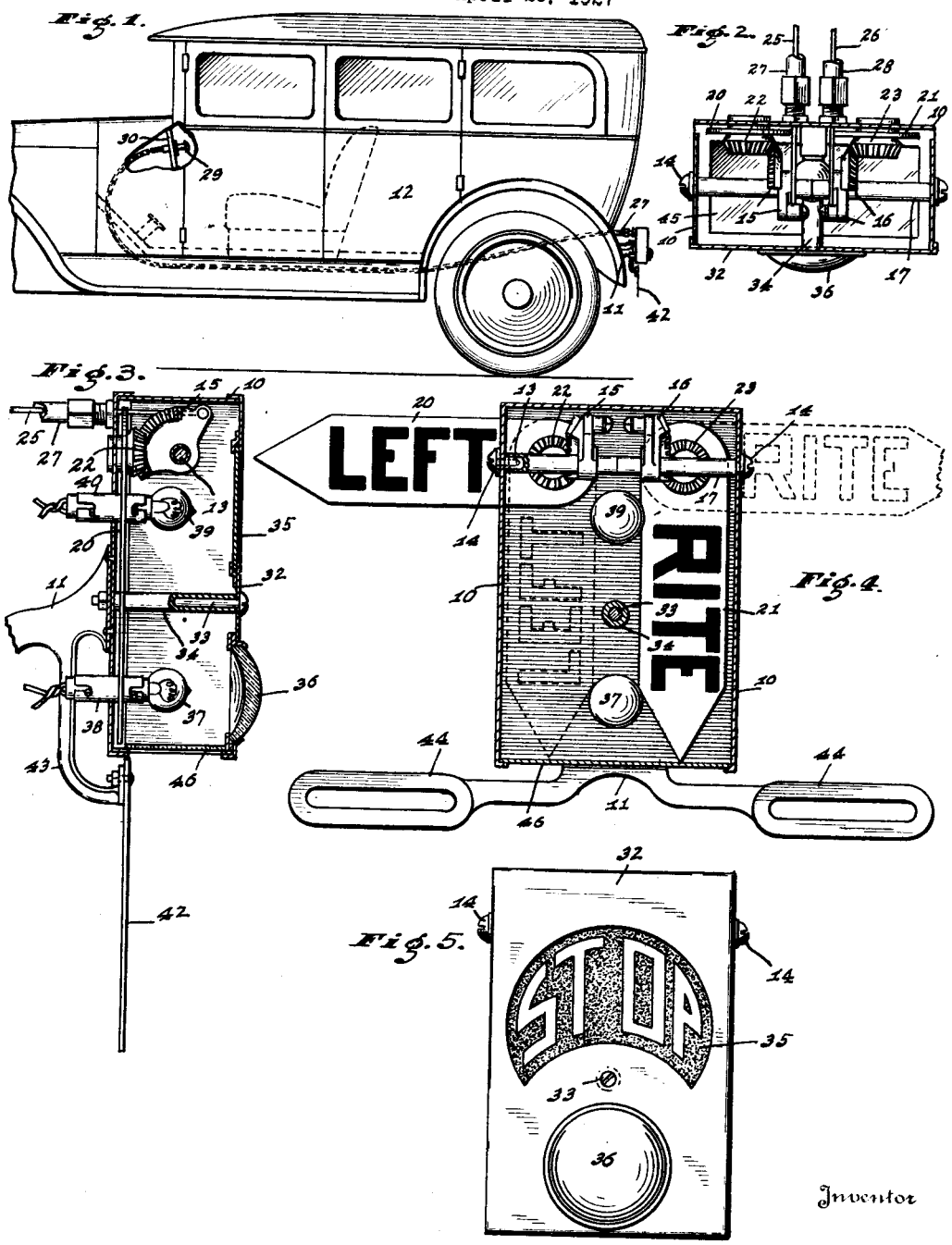
Inventor
GILBERT E. METHERD,
By Ashley Trask
Attorneys Patented Oct. 18, 1927.

1,646,159

UNITED STATES PATENT OFFICE.

GILBERT E. METHERD, OF INDIANAPOLIS, INDIANA.

DIRECTION INDICATOR.

Application filed April 29, 1927. Serial No. 187,438.

It is the object of my invention to produce a device by which the driver of an automobile may indicate to others his intention to turn right, turn left, or stop. More specifically it is my object to produce such a device which may be conveniently and quickly controlled by the automobile driver and which will be positive in operation. A further object of my invention is to incorporate my direction indicator with a tail light adapted to illuminate the license tag or plate.

I accomplish the above objects by providing in a suitable casing a pair of pivotally mounted arms swingable into and out of the casing, and I provide operating means readily accessible to the automobile driver for individually operating these arms. Desirably, I also provide in this casing a stop signal and a tail light.

The accompanying drawing illustrates my invention: Fig. 1 is a fragmental side elevation of an automobile equipped with my indicator; Fig. 2 is a horizontal section through the indicator casing showing the moving parts in plan; Fig. 3 is a vertical longitudinal section through the indicator casing; Fig. 4 is a rear elevation of a casing with the cover plate removed; and Fig. 5 is a rear elevation of the cover plate.

As shown in the drawing, my indicator comprises a casing 10 adapted to be supported by a suitable bracket 11 at some convenient location on an automobile 12. Near the top of this casing and extending transversely thereof, I provide a horizontal shaft 13, such shaft preferably being secured in place by means of screws 14 which pass through the side walls of the casing and into the ends of the shaft 13. Rotatably mounted on the shaft 13 are two independently movable gears or gear-sectors 15 and 16 adapted to be located in position on the shaft 13 by suitable tubular spacers 17 which surround such shaft.

Pivotally mounted on the inside of the front wall of the casing 10 are two turn-indicating arms 20 and 21 which have rigidly therewith pinions 22 and 23. The pinions 22 and 23 engage respectively the sectors 15 and 16 and are adapted to be rotated by such sectors as such sectors are rotated about the shaft 13.

The arms 20 and 21 when retracted, or when in their non-indicating position, occupy a vertical position within the casing 10 as is shown in dotted lines for the arm 20 and in full lines for the arm 21 in Fig. 4. When the arms are moved to their indicating positions, they rotate about their axis of pivotal mounting and pass through slots in the side walls of the casing 10 until they assume a substantially horizontal position as indicated in full lines for the arm 20 and in dotted lines for the arm 21 in Fig. 4.

For the purpose of individually controlling the position of the arms 20 and 21, I attach to the sectors 15 and 16 Bowden wires 25 and 26 which pass through suitable tubes 27 and 28 to individual control devices 29 mounted in the automobile at some position convenient for the driver. As shown in the drawing, the controls 29 are located on the dash 30 of the automobile body, but this is not necessary.

The rear wall of the casing 10 is formed by a cover plate 32 adapted to be held in place on the casing by a bolt 33 which passes through a tubular spacer 34 located between the front wall of the casing and the cover 32. The cover 32 is provided with two light-transmitting openings, in the upper one of which I mount a colored glass 35 bearing the word "stop". The lower light-transmitting opening is provided with the usual tail-light lens 36.

Within the casing 10 and in line with the lens 36, I provide a tail-light bulb 37 supported in a suitable socket 38 mounted on the front wall of the casing. Opposite the glass 35 I locate within the casing 10 a stop-light 39 supported in a suitable socket 40. The stop-light 39 is preferably controlled by a switch operated by the brake pedal of the automobile. I have not illustrated or described details of this switch, as it is well known in the art.

For the purpose of supporting a license tag 42, I may provide the bracket 11 with a downwardly extending arm 43 divided at its lower end into two branches 44 and 45 to which the license tag 42 may be attached. In the bottom of the casing 10, I provide a light-transmitting opening closed by a piece of glass or other transparent material 46.

In the operation of my device, the two arms 20 and 21 are normally disposed vertically within the casing 10. If the driver desires to indicate his intention of making a left-hand turn, he operates the control device 29 connected to the wire 25, thus rotating the associated gear sector 15 about the axis of the shaft 13. Rotation of the gear sector 15 causes rotation of the pinion 22, and this results in swinging the arm 20 out of the casing 10 from the dotted-line position to the full-line position shown in Fig. 4. After the turn is complete, the driver may operate the control device 29 to cause the arm 20 to be retracted within the casing 10. A similar procedure is followed in indicating a turn to the right, except that the arm 21 is raised and subsequently lowered.

I have found it desirable to finish the interior of the casing 10 with white paint or otherwise to provide for the reflection of light; as, by this means, sufficient light escapes through the slots in the side walls of the casing 10 to illuminate the arms 20 and 21 when they are raised.

I claim as my invention:—

1. A direction indicator for vehicles, comprising a casing, a horizontal shaft mounted in said casing and extending transversely thereof, two arms pivotally mounted in said casing on spaced horizontal axes perpendicular to said shaft, two gears rotatably mounted in spaced relation on said shaft, pinions meshing respectively with said gears and rigid respectively with said arms, said casing being provided with slots to permit the passage of said arms as they are moved about their respective axes of pivotal mounting, and control mechanism operable by the driver of the vehicle for rotating either of said gears to cause the associated arm to swing about its axis of pivotal mounting into or out of said casing.

2. A direction indicator for vehicles, comprising a casing, a horizontal shaft mounted in said casing and extending transversely thereof, two arms pivotally mounted in said casing on spaced horizontal axes perpendicular to said shaft, two gears rotatably mounted in spaced relation on said shaft, pinions meshing respectively with said gears and rigid respectively with said arms, said casing being provided with slots to permit the passage of said arms as they are moved about their respective axes of pivotal mounting, two control devices operable by the driver of the vehicle, and Bowden wires respectively connecting said control devices with said gears.

3. A direction indicator as set forth in claim 1 with the addition of a light mounted within said casing whereby light may pass through said slots to illuminate said arms.

4. A direction indicator for vehicles, comprising a casing, a horizontal shaft mounted in said casing and extending transversely thereof, two arms pivotally mounted in said casing on spaced horizontal axes perpendicular to said shaft, two gears rotatably mounted in spaced relation on said shaft, tubular spacers mounted on said shaft between said gears and the side wall of said casing, pinions meshing respectively with said gears and rigid respectively with said arms, said casing being provided with slots to permit the passage of said arms as they are moved about their respective axes of pivotal mounting, and control mechanism operable by the driver of the vehicle for rotating either of said gears to cause the associated arm to swing about its axis of pivotal mounting into or out of said casing.

5. A direction indicator for vehicles, comprising a casing, two direction-indicating arms pivotally mounted in said casing, the side walls of said casing having slots through which said arms may swing into and out of said casing, two pinions rigid respectively with said arms, two gears rotatably mounted in said casing in position to mash respectively with said pinions, and control mechanism operable by the driver of the vehicle for rotating either of said gears to cause the associated arm to swing about its axis of pivotal mounting into or out of said casing.

6. A direction indicator as set forth in claim 5 with the addition of a light mounted within said casing whereby light may pass through said slots to illuminate said arms.

7. A direction indicator for vehicles, comprising a support, two direction-indicating arms pivotally mounted in said support, pinions rigid respectively with said arms, gear means co-operable with said pinions for swinging either of said arms about its axis of pivotal mounting, and control mechanism controlled by the driver of the vehicle for operating said gear means.

8. A direction indicator for vehicles comprising a support, two direction-indicating arms pivotally mounted in said support, pinions rigid respectively with said arms, two gears rotatably mounted in said support and meshing respectively with said pinions, two control devices operable by the driver of the vehicle, and Bowden wires respectively connecting said control devices and said gears.

9. A direction indicator for vehicles comprising a support, two direction-indicating arms pivotally mounted in said support, pinions rigid respectively with said arms, two gears rotatably mounted in said support and meshing respectively with said pinions, and control mechanism operable by the driver of the vehicle for rotating either of said gears to cause the associated arm to swing about its axis of pivotal mounting into or out of said casing.

10. In combination, a casing adapted to be attached to a vehicle, direction-indicating means mounted in said casing, control mechanism operable by the driver of the vehicle for operating said direction-indicating means, said casing having a light-transmitting opening in its bottom wall, a source of light in said casing, and means for supporting a license plate in position to be illuminated by light emitted from said light-transmitting opening.

In witness whereof, I have hereunto set my hand at Indianapolis, Indiana, this 25th day of April, A. D. one thousand nine hundred and twenty-seven.

GILBERT E. METHERD.